UNITED STATES PATENT OFFICE 2,478,860

COPOLYMERS OF VINYL FURANE AND VINYLIDENE CHLORIDE

Albert M. Clifford, Stow, Ohio, assignor to Wingfoot Corporation, Akron, Ohio, a corporation of Delaware No Drawing. Application March 17, 1947, Serial No. 735,244

2 Claims. (Cl. 260—87.7)

This invention relates to new polymeric compositions of matter having useful properties as hereinafter described, and more particularly, to copolymeric masses prepared by the conjoint polymerization of vinyl furane with vinylidene chloride.

In accordance with this invention, vinylidene chloride and vinyl furane were copolymerized in aqueous emulsion in the presence of oxidizing catalysts and emulsion stabilizing agents. Suitable oxidizing catalysts for the practice of this invention are sodium perborate, hydrogen peroxide, sodium persulfate, benzoyl peroxide, ethyl percarbonate, per acid salts of other alkali metals and other organic peroxides and percarbonates. Suitable emulsion stabilizing agents for the practice of this invention are the alkali metal and ammonium salts of high molecular weight carboxylic acids, preferably those having 8 to 22 carbon atoms, the alkali metal and ammonium salts of rosin acids, and in general, any compound having both hydrophilic and hydrophobic radicals. Among the many useful materials for stabilizing the emulsion are the fatty acid soaps made by the saponification of vegetable and animal oils, the rosin soaps, the sodium alkyl sulfates, particularly those in which the alkyl group has between 8 and 22 carbon atoms, the sodium alkyl sulfonates, the various sulfonated hydrocarbons, the amino soaps, such as those of triethanolamine, and other agents known to stabilize aqueous emulsions.

The new copolymers may be prepared with as little as five percent of vinyl furane and as much as 95 percent, although in the preferred compositions the vinyl furane is used in an amount between 25 and 75 percent of the entire copolymer. The vinylidene chloride will also vary between 5 and 95 percent and in the more desirable compounds will be present in amount between 25 and 75 percent. Tripolymers, and copolymers of four or more constituents may also be prepared by adding other compatible olefinic compounds in small amounts. Suitable other olefinic compounds are styrene, chloroprene, vinyl esters of fatty acids, such as vinyl acetate, esters of maleic anhydride, acrylonitrile and alkyl esters of acrylic acid, chloroacrylic acid and methacrylic acid such as methyl acrylate and methyl methacrylate. The polymerizations may be conducted in any conventional emulsion polymerization apparatus. It is usually desirable to provide some means of agitating the reactants to induce a homogeneous copolymerization, and for this purpose a stirring device, a means for tumbling the container, or otherwise agitating the contents may be provided. To induce more rapid polymerization, it is usually desirable to heat the reaction mass to a temperature between 30 and 80° C., care being taken not to promote too rapid polymerization by means of excessive temperatures.

The new vinyl furane copolymers are useful molding or extruding resins under heat and pressure. Plasticizers may be added to improve the thermoplasticity if desired.

Further details of the preparation of the new copolymers are set forth with respect to the following examples.

Example 1

Two grams of vinyl furane and one gram of vinylidene chloride were mixed in a reaction vessel to which was added 15 cc. of 3 percent sodium oleate in aqueous solution and 0.1 gram of sodium perborate. After sealing the reaction vessel, it was tumbled for 72 hours at 50° C. The resulting copolymer was a hard solid and was found to represent a 93 percent yield on the basis of the charged monomers.

Example 2

Several preparations were made in which vinyl furane, vinylidene chloride and chloroprene were copolymerized in various proportions. The technique used was identical to that described in the preceding example and the following table indicates the yield and the physical characteristics of the resulting copolymers.

| Grams Chloroprene | Grams Vinylidene Chloride | Grams Vinyl Furane | Per Cent Yield | Remarks |
|---|---|---|---|---|
| 1.5 | 1.5 | 9.0 | 83 | Tough, thermoplastic. |
| 3.0 | 3.0 | 6.0 | 70 | Tough, resilent. |
| 6.0 | 3.0 | 3.0 | 68 | Relatively hard. |

This application is a continuation-in-part of applications Serial No. 202,270, filed April 15, 1938, now abandoned, and application Serial No.

487,809, filed May 20, 1943, now Patent U. S. 2,419,057, issued April 15, 1947.

Although the invention has been described with respect to specific examples, it is not intended that the details thereof shall be construed as limitations upon the scope of this invention, except to the extent incorporated in the following claims.

I claim:
1. A copolymer of 5 to 95 percent vinyl furane and 95 to 5 percent vinylidene chloride.
2. A copolymer of 25 to 75 percent of vinyl furane and 75 to 25 percent of vinylidene chloride.

ALBERT M. CLIFFORD.

REFERENCES CITED

The following references are of record in the file of this patent:

UNITED STATES PATENTS

| Number | Name | Date |
|---|---|---|
| 1,911,722 | Sorenson | May 30, 1933 |